United States Patent [19]
McMahon, Jr.

[11] 3,803,483
[45] Apr. 9, 1974

[54] SEMICONDUCTOR STRUCTURE FOR TESTING OF METALLIZATION NETWORKS ON INSULATIVE SUBSTRATES SUPPORTING SEMICONDUCTOR CHIPS

[75] Inventor: Maurice T. McMahon, Jr., Wappingers Falls, N.Y.

[73] Assignee: International Business Machines Corporation, Armonk, N.Y.

[22] Filed: Mar. 29, 1973

[21] Appl. No.: 346,238

Related U.S. Application Data

[62] Division of Ser. No. 250,537, May 5, 1972.

[52] U.S. Cl................................ 324/51, 324/158 F
[51] Int. Cl............................................. G01r 31/02
[58] Field of Search... 324/51, 158 D, 158 F, 158 P; 317/234 N

[56] References Cited
UNITED STATES PATENTS

| | | |
|---|---|---|
| 3,265,968 | 8/1966 | Bilodeau et al................ 324/51 X |
| 3,289,046 | 11/1966 | Carr......................... 324/158 F UX |
| 3,378,764 | 4/1968 | Peltz et al............................ 324/51 |
| 3,558,994 | 1/1971 | Bernstein................ 317/234 N UX |

*Primary Examiner*—Gerard R. Strecker
*Attorney, Agent, or Firm*—J. B. Kraft

[57] ABSTRACT

A method for testing the interconnector network on insulative substrates on which integrated circuit chips are to be mounted. The method involves testing for the operability of said interconnector network prior to the mounting of the chips by temporarily mounting at the chip sites a plurality of test chips. Each of these test chips contains a plurality of diodes which respectively connect the chip terminals to a common terminal. The chip terminals are connected to the interconnector network and the common terminal is externally accessible through the substrate. Potential levels are selectively applied to a plurality of test points in the network and differences in potential level between these test points and/or between the points and one or more of the common terminals are determined.

4 Claims, 6 Drawing Figures

SEMICONDUCTOR STRUCTURE FOR TESTING OF METALLIZATION NETWORKS ON INSULATIVE SUBSTRATES SUPPORTING SEMICONDUCTOR CHIPS

This is a continuation, division, of application Ser. No. 250,537 filed May 5, 1972.

BACKGROUND OF INVENTION

The present invention relates to the testing of the interconnector networks on insulative surfaces which are to support integrated circuit chips in integrated circuit package units or modules. More particularly, the present invention relates to such high density microminiature packages in which maximum density integrated circuit chips are mounted on insulative substrates as close as possible to each other to provide a high density package.

With the ever-increasing microminiaturization of integrated circuit chips and packages and the attendant increase in circuit densities per chip and chip densities per insulative substrate or module so that the present state of the art is approaching the order of hundreds of circuits per chip and tens of thousands of circuits per module, physically accessing test points in not only the chip but even the supporting substrate for testing purposes is becoming exceedingly difficult. In the past, it has been conventional practice in testing for the integrity and operability of interconnector networks on insulative substrates, such as modules or boards, to simultaneously contact with test probe structures all of the test points in the network necessary to test the network for short-circuits or breaks in the interconnectors. However, as a result of the rapid rate of microminiaturization in this art, the number of chips mounted per unit area of insulative substrate has greatly increased; also, the number of contacts between the interconnector network and the mounted chips has also greatly increased. Accordingly, the number of test points required to test the interconnector network has greatly increased and, more significantly, the density of such contact points per unit area of insulative substrate has also increased many-fold. With this greatly increased density of required test points, physical contact simultaneously with all of the test points in the conductive network on an insulative substrate has become impractical. Therefore, there is a need in the testing art for a method of testing the interconnector networks on insulative substrates which avoids the simultaneous contacting or probing of all of the test points.

SUMMARY OF INVENTION

Accordingly, it is a primary object of the present invention to provide a method for testing the interconnector network on insulative substrates to be used in supporting semiconductor integrated circuit chips which avoids the necessity of simultaneously probing all of the test points in the network.

Another object of the present invention is to provide a method of testing such interconnector networks wherein the test points can be conveniently contacted physically by test probes.

It is yet a further object of the present invention to provide a method for testing of such conductive interconnector networks which permits a determination to be made as to the integrity and operability of the network prior to the mounting of the integrated circuit chips on the substrate.

It is even another object of the present invention to provide an intermediate test structure including the insulative substrate to be tested which permits the testing of the interconnector networks without simultaneously probing all of the test points.

The present invention provides a test method for testing the conductive interconnector network in the insulative substrate prior to the mounting of the integrated circuit chips which involves temporarily mounting at the plurality of chip sites at which the chips are to be subsequently mounted, a plurality of semiconductor test chips. Each of the test chips comprises a plurality of unidirectional semiconductor devices, e.g., diodes, each device respectively connecting a terminal of the test chip to a common terminal. Then, by applying selected potential levels to test points in the conductive interconnector network which are connected to chip terminals and by determining differences in such applied potential levels between respective test points and/or between such test points and the common terminals, the interconnector network may be tested for short-circuits as well as for breaks in the interconnectors.

Preferably, the test chips are mounted on the substrate by fusible metal contacts between the chip terminals and corresponding interconnector networks terminals. Upon the completion of testing, these test chips are removed from the substrate by fusing such contacts.

Instead of simultaneously contacting all of the test points in the interconnector network, the present method preferably involves sequentially contacting, with groups of test probes on a test head, the groups of test points associated with each of the chip sites. These test points are preferably arranged around the periphery of the chip site and spaced from the chip.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figure 1:
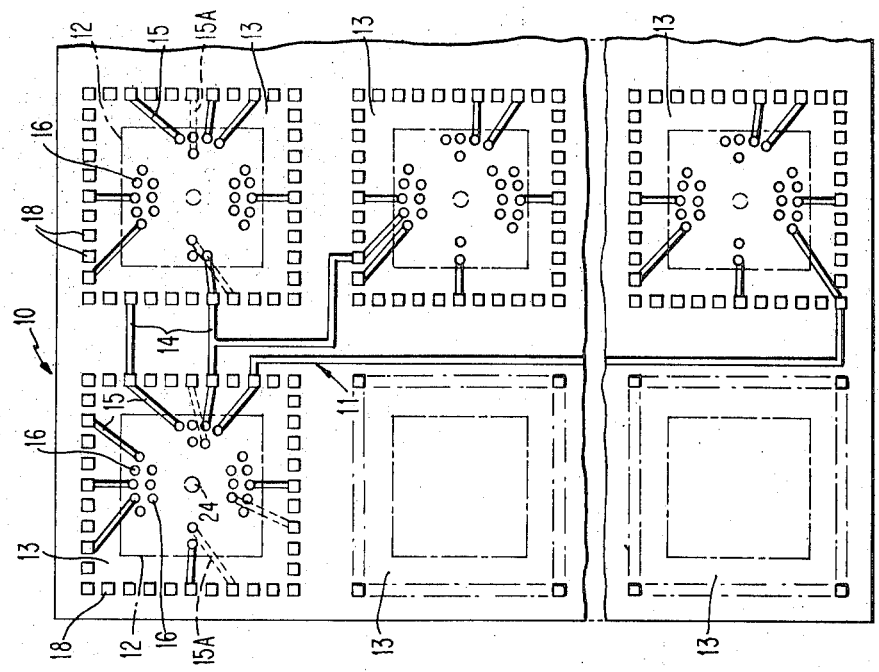
FIG. 1 is a diagrammatic fragmentary plan view of an insulative substrate containing an interconnector network which is to be tested in accordance with the method of the present invention; the chips which are to be mounted on the substrate and their chip terminals are shown in phantom.
Figure 2:
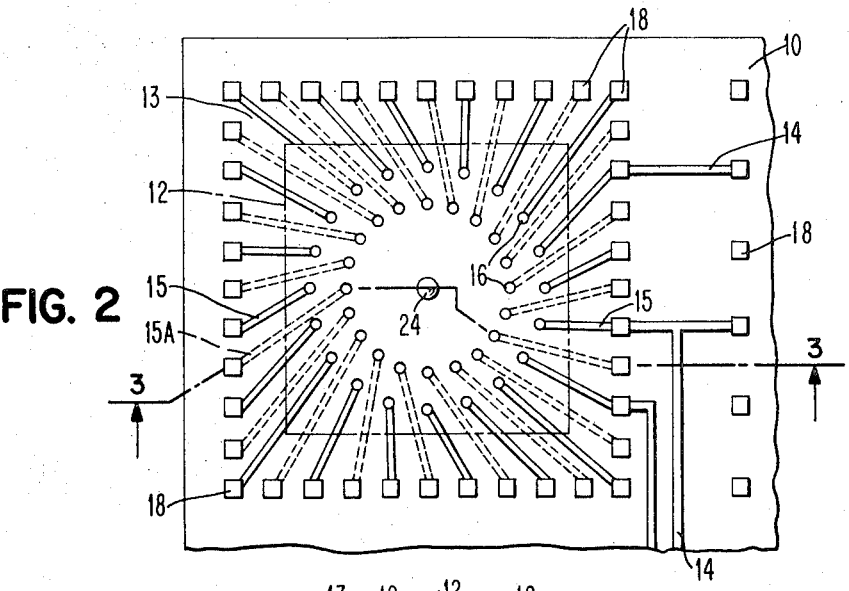
FIG. 2 is an enlarged diagrammatic fragmentary view of an insulative substrate chip site showing the chip to be mounted on the substrate in phantom lines.

With reference first to FIGS. 1 and 2 in the drawings, there will now be described an embodiment of the test method of the present invention. Insulative substrate 10, which is shown in a fragmentary plan view in FIG. 1, comprises an interconnector network 11 which interconnects a plurality of integrated circuit chips to be mounted on the substrate. The chips 12, which are shown in phantom line, are mounted at a plurality of chip sites 13 on the surface of substrate 10. As an order of magnitude, the structures to be tested comprise in the order of 100 chips, approximately 100 × 100 mils, mounted on an insulative substrate approximately 2 × 2 in size. For convenience in describing the invention, only a few representative chip sites 13 are shown and only a few representative portions of the interconnector network 11 are shown. The interconnector network shown comprises inter-chip site connectors 14, as well as intra-chip connectors 15. The interconnector network may have portions, such as connectors 14 and 15 (FIGS. 2 and 3), formed on the surface of substrate 10, as well as portions, such as intra-chip connectors 15A, which are formed below the surface level of substrate 10.

Substrate 10 may be conveniently made of a ceramic material, and in order to provide portions of the interconnector network, such as 15A, below the surface, a multi-level ceramic substrate may be used. Intra-chip connectors 15 and 16A connect interconnector network terminals 16 corresponding to chip terminals 17 and these chip terminals are mounted upon and bonded to the interconnector terminals when the integrated circuit chip is mounted on substrate 10. Intra-chip connectors 15 and 15A resepctively connect network terminals 16 to an array of pads 18 which are arranged in groups around the periphery of each chip site and are utilized as test points in the subsequent testing of the interconnector network by contacting such test points or pads 18 with a plurality of probes. Intra-chip connectors 14 respectively connect pads 18 associated with one chip site with pads associated with another chip site to form the interconnections between chip sites.

For convenience in illustration, in the structure shown, there are approximately 50 network terminals 16 associated with each chip site and, consequently, the chips to be mounted at the site will have 50 corresponding terminals; also, 50 test points or pads 18 are associated with each chip site. The state of the integrated circuit art has reached a stage where there would more realistically be one hundred chip terminals and, consequently, 100 pads 18 per chip site.

Figure 6:
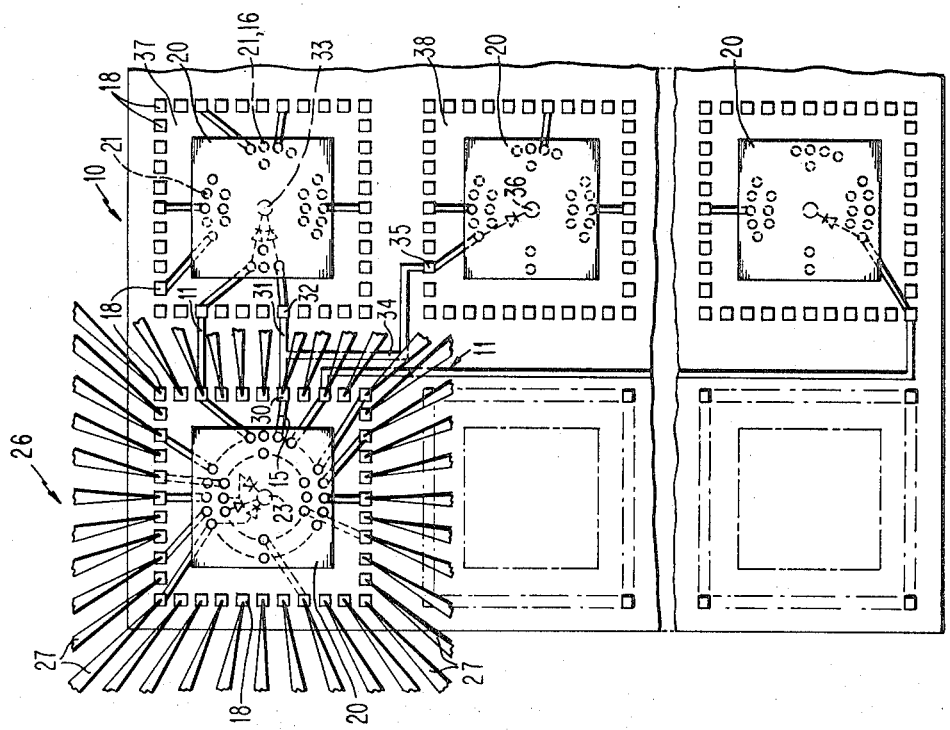
FIG. 6 is a fragmentary diagrammatic plan view of the insulative substrate wherein the test chips are mounted at each of the test sites and a fragment of the test probe array contacting the test points at one of the test sites is shown with a portion broken away to expose the underlying interconnector network.
Figure 4:
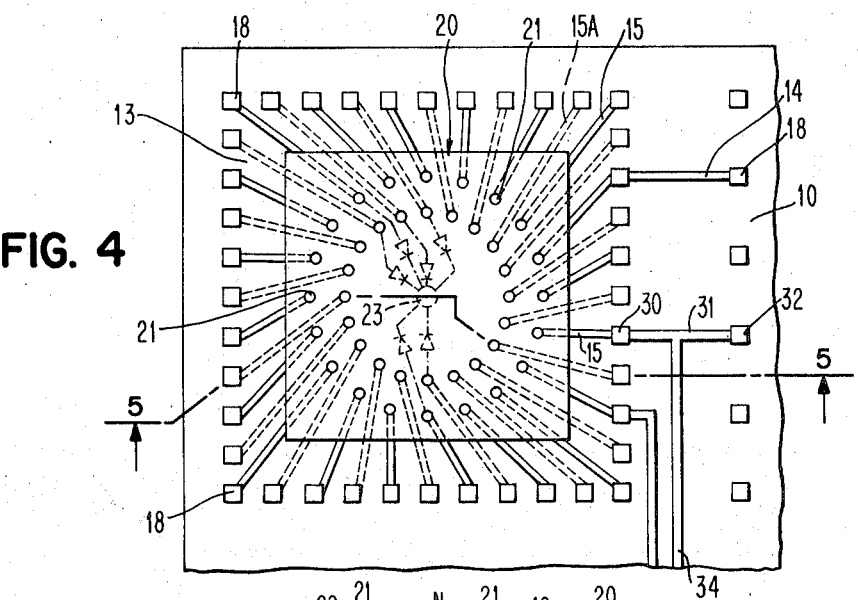
FIG. 4 is a diagrammatic fragmentary view of a chip site on the insulative substrate similar to the view of FIG. 2 except that a test chip is mounted at the chip site.
Figure 5:
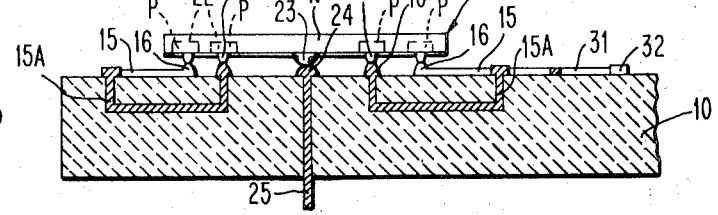
FIG. 5 is a cross-section view taken along line 5—5 of FIG. 4.

Next, with reference to FIGS. 4, 5 and 6, a plurality of test chips 20 are mounted temporarily at each of the chip sites. These test chips have a plurality of terminals 21 which are identical in structure and coincident with the terminals on the integrated circuit chips which are to be subsequently permanently mounted on the insulative substrate. In the illustrative embodiment, because the integrated circuit chips to be subsequently mounted will be joined to the substrate by a "controlled-collapse" technique in which the chip terminals or pads are fused during joining test chips 20 are joined to the substrate by a similar technique. This "controlled-collapse" technique is described in detail in U.S. Pat. No. 3,429,040 and in the article "A Critique of Chip Joining Techniques," L. F. Miller, *Solid State Technology*, Apr. 1970, pp. 50–62. It should be understood, of course, that where the integrated circuit chips are to be joined to the substrate by other techniques such as beam lead, ultrasonic bonding or thermocompression bonding which are also described in the above publication, the test chips would also be temporarily respectively joined to the substrate by such other techniques.

Figure 3:
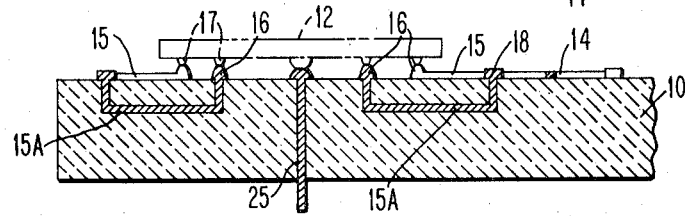
FIG. 3 is a cross-section taken along line 3—3 of FIG. 2.

The structures shown in FIGS. 6, 4 and 5 respectively corresponding to the structures shown in FIGS. 1, 2 and 3 except that the test chips are shown mounted at the chip sites. The test chips comprise a plurality of diodes which are shown schematically in phantom lines in FIG. 4. Although only a few of these schematic diodes paths are shown in FIG. 4, there is one such diode path for every chip terminal 21 and, consequently, for every network terminal 16. This diode is formed by having a diffused P type region 22 in contact with each test chip terminal 21. The junction between this P type region and the N type body of test chip 20 provides a diode path, as shown in FIG. 4, between each of the chip terminals 21 and common chip terminal 23. Common chip terminal 23 is joined to a corresponding network terminal 24 on the substrate which may be externally accessed. In the embodiment shown, such external access is provided by means of pin 25 passing through the substrate.

For convenience in illustration, common chip terminal 23, substrate terminal 24 and pin 25 have been shown as being centrally located at the chip sites. This need not be the case. The common terminal may be located at any point in the chip provided that it it connected to a point in the substrate which may be externally accessed, either directly by a pin as shown, or indirectly by an interconnector which runs along the insulative substrate 10 to a point which is externally accessed by a pin. Since it is customary practice during the operation of the integrated circuit package to access points in the interconnector network with pins which provide the various power supplies required, such power pins may be conveniently utilized temporarily during testing for pin 25 to provide external access to the common terminal in the chips.

As previously mentioned, the test chips are mounted temporarily on the insulative substrate 10, as shown in FIGS. 4–6, by a "controlled collapse" solder fusion technique as described in U.S. Pat. No. 3,429,040. In FIG. 6, only portions of the interconnector network 11 on substrate 10 are shown for convenience in illustration. Actually, the interconnector network 11 is more complex and has many more interconnectors than shown. Also, only a few of the chip terminals 21 and the diode paths to common terminal 23 are shown; actually, there is such a diode path for each of the fifty chip terminals.

Let us now consider a typical test cycle with reference to FIG. 6. A tester probe head 26 is shown contacting test points 18 at the first chip site. The structure of the test probe head is merely illustrative of standard tester probe heads known in the art. The head comprises an array of probes 27, one for each of the 50 test points 18. A number of test probes 27 have been broken away so that the interconnector pattern 11 may be more readily seen. Head 26 is capable of moving in the X and Y directions. Each of the probes 27 is capable of applying selected voltages to test points 18 and capable of sensing voltage levels at these test points. The test probe head is controlled in the conventional manner by computer means, not shown, which have the capability of applying the voltages to the test points required by the testing procedure and for receiving and interpreting the data sensed by probes 27.

In a typical test procedure, a single test head 27 contacts test points 18 associated with each of the test sites in a preselected sequence. In FIG. 6, probe head 26 is shown in contact with test points 18 associated with the first of the chip sites. Starting with the first of the 50 test points which is designated with the numeral 30 in FIGS. 4 and 6, the intra-chip connector 15 connected to point 30 is first tested for continuity by applying a voltage level through the test head 26 to only point 30. Then, the voltage drop between point 30 and common point 23 at the first chip site is determined by sensing the voltage level at external pin 25 associated with said first chip site. If intra-chip connector 15 is complete, there should be substantially little voltage difference between point 30 and pin 25 because the voltage is applied in the direction which would maintain the diode path as conductive.

Next, while still maintaining the same voltage level at point 30, all of the other 49 test points 18 at the first chip site are shorted together through the probe head at a lower potential level than point 30. The potential level at the other 49 test points is then sensed through their respective probes. If any of these other 49 test points rises in voltage level approaching that being applied to point 30, this is an indication that there is in the intra-chip connectors a short-circuit which permits a path between point 30 and the other elevated test point other than through the diode array on chip 20. If there are no such short-circuits, the diode path associated with the other 49 test points would be rendered nonconductive by such applied voltages.

Next, still with respect to the first test point 30, the interchip connector segment 31, interconnecting the test point 30 with test point 32 at a second chip site, is tested in the following manner. An elevated voltage level is applied by the probe to only point 30 and the resulting voltage level at common terminal 33 at the second chip site is sensed through the external pin associated with terminal 33. The voltage level at this external pin should be substantially the same as the voltage being applied by the test head to point 30.

Similarly, with the elevated voltage level still applied to test point 30, interconnector 34, which connects point 30 to test point 35 at a third chip site, is tested by sensing the voltage level at common terminal 36 of this third chip site through the pin associated with this common terminal.

Next, with the elevated voltage still applied to test point 30, the interconnector network must now be tested to insure that there are no short-circuits between test point 30 and test points at other chip sites. Point 30 is only connected to the second chip site 37 and the third chip site 38. It is not connected to any of the other chip sites on the insulative substrate. Therefore, each of the common terminals at each of such other unconnected chip sites should be at a voltage level significantly different from test point 30. With test point 30 still at its elevated level, the externally accessible pins associated with each of the common terminals at such other chip sites are sensed. All of these pins should be at a voltage level substantially different from that of point 30. If any of these pins has a voltage level approaching that applied to point 30, this is an indication that there is a short-circuit between point 30 and the chip site of said pin.

The testing of the first point in the test point array associated with the first chip site is now completed, and with the test head still in the first position, each of the other 49 test points in the array at the first chip site is similarly tested with respect to its intra-chip connections and its inter-chip connections. Upon the completion of the testing of all of the fifty points at the first chip site, test head 26 is stepped to the next chip site to be tested and the procedure is repeated for each of the 50 test points at the second chip site. It should be noted that as the testing progresses, inter-chip connections between a test point in a chip site under test and a test point in a chip site previously tested will have been already tested. In such a case, the procedure will be skipped with respect to inter-chip connections between a chip site under test and one previously tested. The computer controlling the test head may readily keep track of such previously tested inter-chip connections in any conventional manner.

Accordingly, in the manner described, a single test head which is in contact with a single chip site at any one time is used to test all aspects of the interconnector network on substrate 10 related to said chip site. This avoids probing of more than one test site with more than one test head which becomes physically impractical because of increasing chip and test point densities.

Upon the completion of the testing, all of the test chips 20 are removed. In the embodiment shown, this is accomplished by a removal procedure which involves melting or fusing terminals 21 which bond the test chip to the two corresponding terminals in the substrate; there are many known techniques in the art for removing chips from the insulative substrate. Some of these are discussed in general in the above-mentioned publication, "A Critique of Chip-Joining Techniques", by L. F. Miller. Various techniques for chip removal have been described in the art. For some examples of such techniques, reference is made to "Solder Terminal Rework Technique," C. Chiou et al., IBM Technical Disclosure Bulletin, March 1970, page 1666, "Chip Removal by Hot Gas," C. R. Tickner, IBM Technical Disclosure Bulletin, December 1968, page 875, and "Localized Heating of Chip Bonding Pad," C. Chiou et al., IBM Technical Disclosure Bulletin, January 1967, page 1051. The chips may be removed individually from the insulative substrate or they may be removed as a group by a technique which involves heating and then agitating the substrate to, in effect, shake the test chips off the substrate. After testing and removal of the test chips, the integrated circuit chips may be then mounted at the respective test sites utilizing, in the present illustrative embodiment fusible solder techniques as described. Depending on the completeness of the solder removal from the substrate during the removal of the test chips, some "dressing" of the insulative substrate may be preferable to remove any of such solder residues prior to the mounting of the integrated circuit chips on the tested insulative substrate.

After the removal of the test chips, the actual integrated circuit chips are permanently joined to the chip sites utilizing the appropriate joining technique as described above, e.g., controlled collapse technique in the present embodiment. The insulative substrate structure described above, which includes an externally accessible pin at each chip site and an array of test points around the chip site periphery, has a further advantage in performing functional tests on the integrated circuit chip after the chip is mounted on the substrate. With this insulative substrate structure, it is possible to selectively power the integrated circuit chips one at a time through the external pin while the other chips remain "off." A test head of the type shown in FIG. 6 contacts the test points surrounding the powered chip, and the conventional functional tests are performed upon the chip through signals applied to the test points by the head, and the results are sensed in a similar manner.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A semiconductor structure for use in listing the interconnector network on insulative substrates comprising an insulative substrate having a network of conductive interconnectors for interconnecting the terminals of a plurality of chips, said network having groups of terminals respectively located at a plurality of chip sites;

a plurality of semiconductor chips respectively mounted on said insulative substrate at said chip sites, each of said chips having a plurality of chip terminals corresponding to and conductively bonded to the group of network terminals at a chip site, and each of said chips further including a common terminal and a plurality of unidirectional semiconductor devices, each device respectively connecting a chip terminal to said common terminal.

2. The structure of claim 1 wherein said unidirectional devices are diodes.

3. The structure of claim 1 wherein said network further includes network terminals connected to said common terminals, and means for externally accessing said network terminals through said substrate.

4. The structure of claim 3 wherein said means for externally accessing said network terminals are pins extending through said substrates.

* * * * *

UNITED STATES PATENT OFFICE
CERTIFICATE OF CORRECTION

PATENT NO. : 3,803,483
DATED : April 9, 1974
INVENTOR(S) : Maurice T. McMahon, Jr.

It is certified that error appears in the above-identified patent and that said Letters Patent are hereby corrected as shown below.

Column 1, Line 6     delete "continuation"

Column 4, Line 36     delete "it it" and substitute -- it is --

Column 6, Line 61     after "embodiment" insert -- , --

Column 7, Line 27
Claim 1     delete "listing" and substitute -- testing --

Signed and Sealed this second Day of December 1975

[SEAL]

Attest:

RUTH C. MASON
Attesting Officer

C. MARSHALL DANN
Commissioner of Patents and Trademarks